United States Patent
Tsutaichi et al.

(10) Patent No.: US 7,561,684 B2
(45) Date of Patent: Jul. 14, 2009

(54) MOUNTING STRUCTURE FOR AN ELECTROACOUSTIC TRANSDUCER

(75) Inventors: Fumio Tsutaichi, Akishima (JP); Eiji Okita, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 531 days.

(21) Appl. No.: 11/378,823

(22) Filed: Mar. 17, 2006

(65) Prior Publication Data
US 2006/0258325 A1    Nov. 16, 2006

(30) Foreign Application Priority Data
Mar. 18, 2005    (JP) .............................. 2005-079073

(51) Int. Cl.
*H04M 1/00*    (2006.01)
*H04M 9/00*    (2006.01)
*H04R 9/08*    (2006.01)

(52) U.S. Cl. .......................... 379/433.01; 379/433.03; 379/437; 381/361

(58) Field of Classification Search ............ 379/433.01, 379/433.03, 437, 451; 381/355, 361, 365; 455/575.1; 181/149
See application file for complete search history.

(56) References Cited

FOREIGN PATENT DOCUMENTS

| JP | 10-4273 | 1/1998 |
|---|---|---|
| JP | 10-210121 | 8/1998 |
| JP | 2004-112565 | 4/2004 |
| KR | 2003-0012589 | 2/2003 |
| KR | 2003-0040895 | 5/2003 |

*Primary Examiner*—Tuan D Nguyen
(74) *Attorney, Agent, or Firm*—Cohen Pontani Lieberman & Pavane LLP

(57) ABSTRACT

In a portable telephone, the front side of a back casing is covered with a front casing. A circuit substrate is housed in a housing concave portion of the back casing and the front side of the circuit substrate is covered with a waterproof type keypad sheet material. The outer edge section of the waterproof type keypad sheet material is fastened between the outer edge section of the back casing and the outer edge section of the front casing. A mounting hole is formed in the waterproof type keypad sheet material and a microphone holder is inserted into the mounting hole. A microphone is mounted in the microphone holder, a waterproof membrane is affixed on the end face of the microphone holder and a small opening of the microphone holder is blocked by the waterproof membrane.

17 Claims, 4 Drawing Sheets

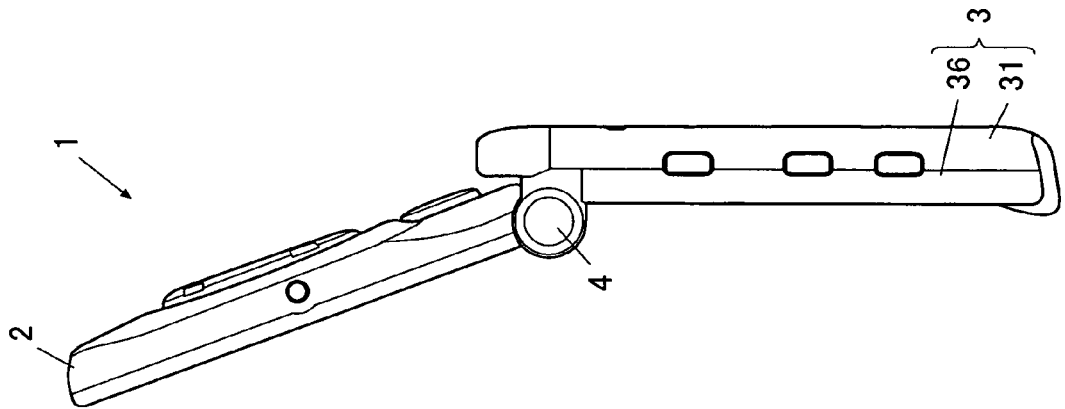
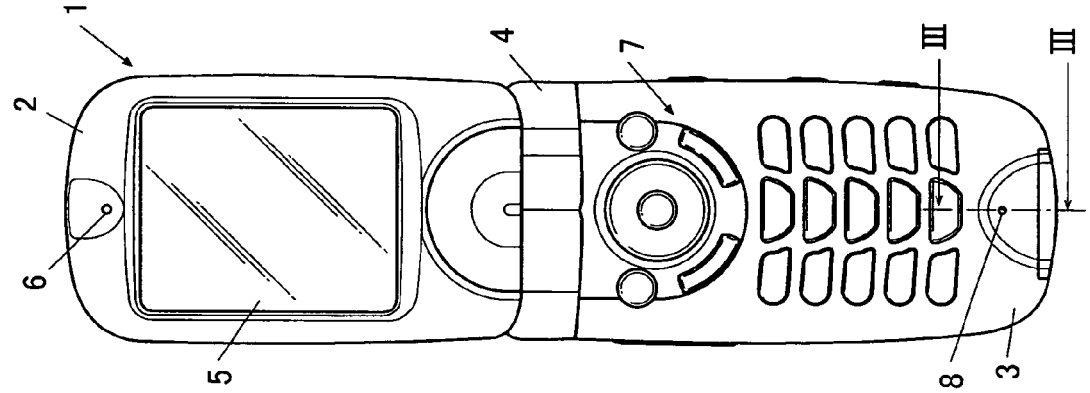
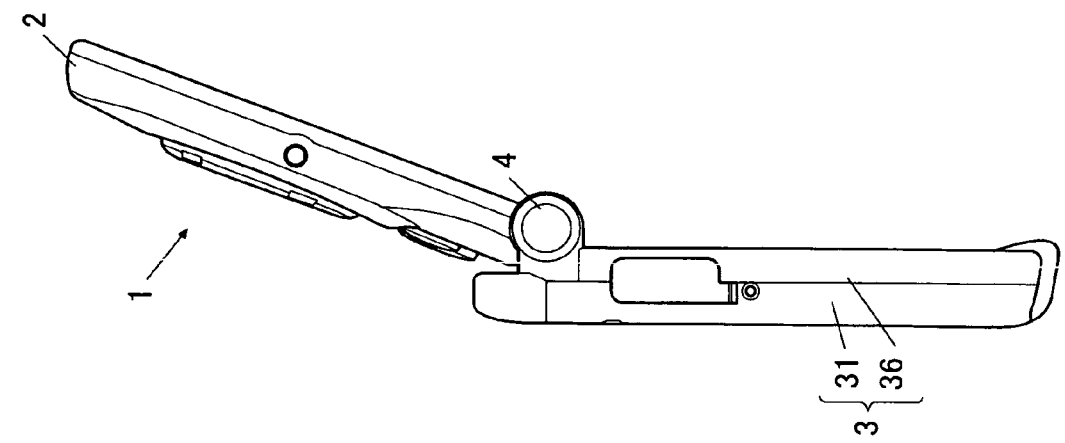

MOUNTING STRUCTURE FOR AN ELECTROACOUSTIC TRANSDUCER

CROSS-REFERENCE TO RELATED APPLICATION

This application is based upon and claims the benefit of priority from the prior Japanese Patent Application No. 2005-079073, filed Mar. 18, 2005, the entire contents of which is incorporated herein by reference.

BACKGROUND OF THE INVENTION

1. Field of the Invention

The present invention relates to a mounting structure for an electroacoustic transducer, for example, a microphone, a speaker, etc.

2. Description of the Related Art

In order to enhance waterproofing of a portable electronic device, the apparatus assembly typically consists of waterproof packing, such as an O-ring type, fitted in the adjoining sections of the front case and back case housing.

Additionally, in a portable electronic device provided with keypad openings in the front case, there are apparatus which have an O-ring and a keypad sheet formed as one piece and fitted in the adjoining sections of the front and back casings (for example, refer to Japanese Laid-Open (Kokai) Patent Application No. Heisei 10-004273 (1998) titled "CASE BODY WATERPROOF STRUCTURE OF ELECTRIC EQUIPMENT").

In portable electronic devices, an electroacoustic transducer such as a microphone and/or speaker is commonly furnished, wherein waterproofing of the microphone and speaker is also achieved.

For example, the portable electronic devices as disclosed in the conventional prior art of Japanese Laid-Open (Kokai) Patent Application No. Heisei 10-210121 (1998) titled "MOBILE COMMUNICATION EQUIPMENT" and Japanese Laid-Open (Kokai) Patent Application No. 2004-112565 titled "WATERPROOFING STRUCTURE OF WIRELESS MACHINE," contain a telephone call opening for a microphone formed in the housing and further designed so that the telephone call opening is surrounded by a cylindrical boss in the inner surface of the housing. This portable electronic device blocks the telephone call opening with a waterproof cover. Specifically, a waterproof cover is inserted into the cylindrical boss and then a microphone is inserted into that boss so that water cannot penetrate through the telephone call opening. Accordingly, the microphone can be mounted within the cylindrical boss and waterproofing of the microphone is also achieved.

However, in cases where equipped with a waterproof cover and a microphone within a cylindrical boss, there is a problem that the assembly operation of the microphone and the waterproof cover is mediocre. In particular, it is troublesome to arrange these at the bottom of the cylindrical boss in order to block the telephone call opening with the waterproof cover.

SUMMARY OF THE INVENTION

In accordance with an aspect of the present invention, there is provided a mounting structure for an electroacoustic transducer relating to an electronic apparatus having a plurality of casings, comprising an elastic sheet material placed between the plurality of casings and penetrated by a mounting hole; a cylindrical holder fitted in the mounting hole; a waterproof membrane affixed to one end face of the cylindrical holder such that one opening of the cylindrical holder is blocked by the waterproof membrane; wherein the mounting hole is blocked by the cylindrical holder and the waterproof membrane; and an electroacoustic transducer mounted within the cylindrical holder.

Furthermore, the electroacoustic transducer may be a microphone, may be a speaker or may be relevant to a combination of both of these.

The above and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 1A~1C respectively show a left side view a front view and a right side view of a portable telephone 1;

DETAILED DESCRIPTION OF THE PREFERRED EMBODIMENTS

Hereinafter, the preferred embodiments of the present invention will be explained in detail with reference to the drawings.

In this regard, although the embodiments described below technically refer to desirable various limitations in order to execute the invention, the scope of the present invention is not limited to the following preferred embodiments and illustration examples.

A. First Embodiment

FIGS. 1A~1C are three surface view diagrams of a portable telephone 1 applied to the mounting structure for an electroacoustic transducer of the present invention. FIGS. 1A~1C respectively show a left side view, a front view and a right side view of a portable telephone 1.

In the portable telephone 1, an upper housing 2 is joined to a lower housing 3 by a hinge 4. The upper housing 2 can be rotated to the lower housing 3 centering on the axis of the hinge 4. In a situation where the upper housing 2 has been folded (closed) toward the lower housing 3, the front of the upper housing 2 faces the front of the lower housing 3. In a situation where the upper housing 2 has been unfolded (opened) away from the lower housing 3, both the front of the upper housing 2 and the front of the lower housing 3 will be turned toward the front face.

Figure 2:
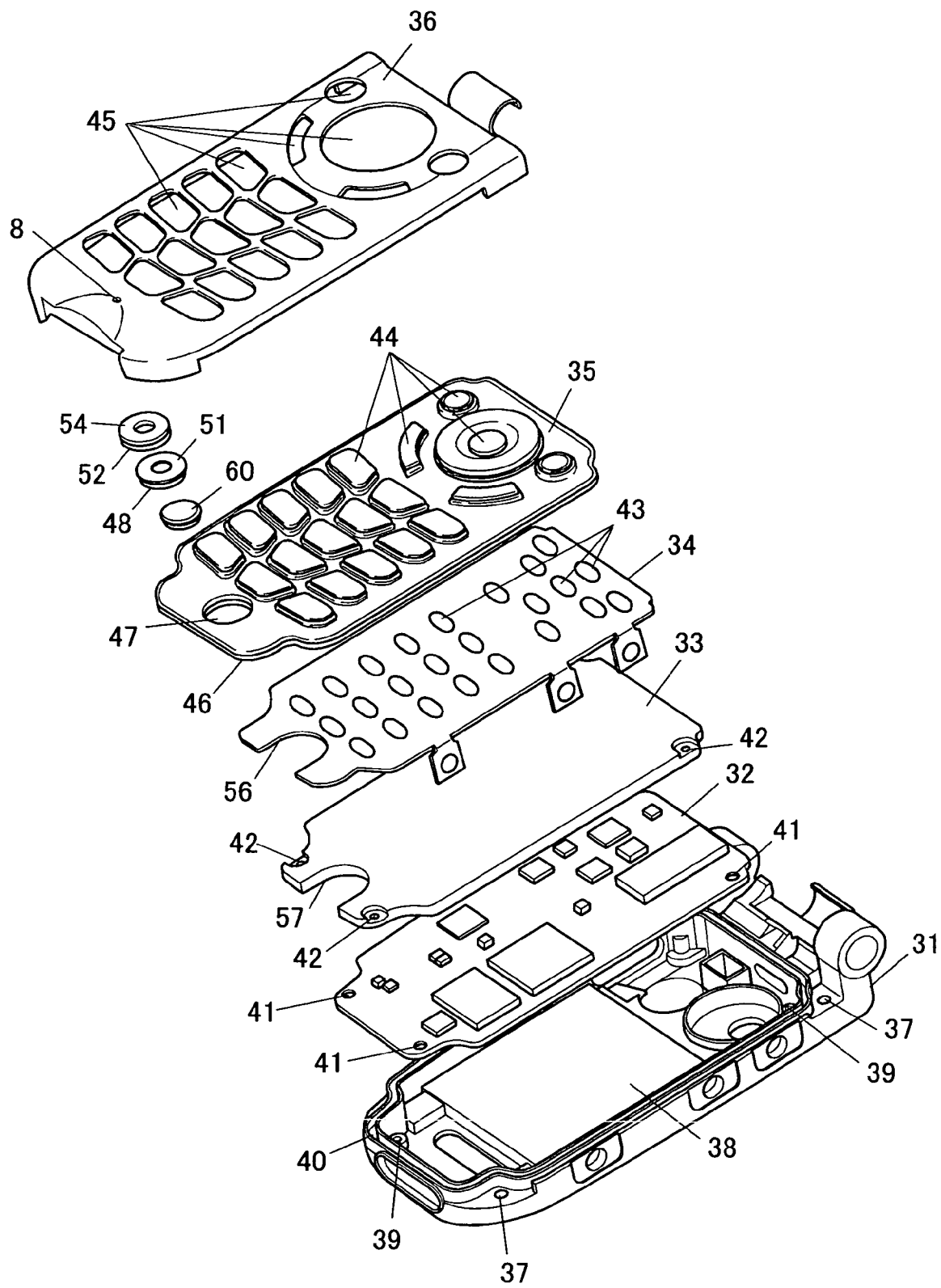
FIG. 2 shows an exploded perspective view of a lower housing 3.

A display section 5 having a liquid crystal display panel or an electroluminescence display panel is formed on the front of the upper housing 2. A speaker opening 6 is formed in the front upper part of the upper housing 2. A speaker is housed inside the upper housing 2 facing the speaker opening 6. A keypad operation section 7 is formed on the front of the lower housing 3. A microphone opening 8 is formed on the front lower part of the lower housing 3. A microphone 60 (as seen in FIG. 2, etc.) is mounted on the inside of the lower housing 3 so as to face toward the microphone opening 8. Hereinafter, the mounting structure of the microphone 60 will be specifically explained using FIG. 2 and FIG. 3.

Figure 3:
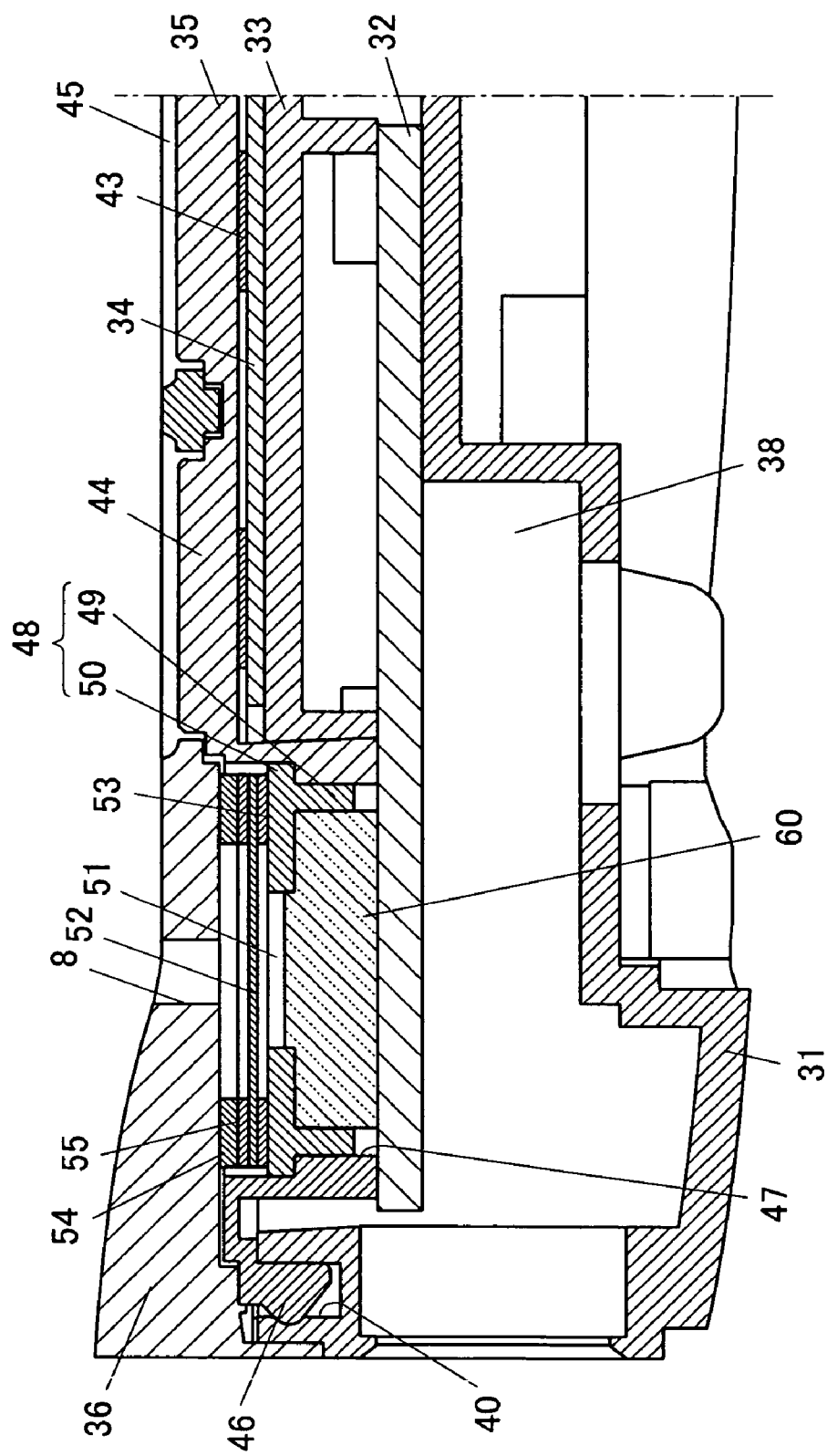
FIG. 3 shows a cross-sectional view diagram of the section aligned with the III-III cutout line of FIG. 1.

FIG. 2 shows an exploded perspective view of a lower housing 3. FIG. 3 shows a cross-sectional view diagram of the section aligned with the III-III cutout line of FIG. 1. As seen in FIG. 2 and FIG. 3, the lower housing 3 is provided with a cover front casing 36 for the front side of the back casing 31. The front side of the back casing 31 is indented with a housing concave portion 38. Female screw holes 39 are provided in the corner sections of the housing concave portion 38. Furthermore, a slot 40 is formed along the perimeter edge of the housing concave portion 38 and the slot 40 is enclosed by the housing concave portion 38.

A circuit substrate 32 and an intermediate plate 33 are housed in the housing concave portion 38. The circuit substrate 32 is covered with the intermediate plate 33. In each of the corner sections of the circuit substrate 32, there is a hole 41 which penetrates the circuit substrate 32. In each of the corner sections of the intermediate plate 33, there is a hole 42 which penetrates the intermediate plate 33. A screw (not shown) is inserted through each hole 41 and hole 42, which are fastened in the screw holes 39. Accordingly, the circuit substrate 32 is fixed within the housing concave portion 38 in a covered stated by the intermediate plate 33.

In front of the intermediate plate 33, a keypad FPC 34 (Flexible Printed Circuit) is wired to the respective connector joints on the circuit substrate 32 via a wiring section formed as one piece. The keypad FPC 34 is covered with a waterproof type keypad sheet material 35 that has elastic properties (elastomer material). The keypad FPC 34 is inserted between the waterproof type keypad sheet material 35 and the intermediate plate 33.

A plurality of thin switches 43, such as a dome switch, is formed in the keypad FPC 34. A plurality of convex-like keys 44 are formed on the front of the waterproof type keypad sheet material 35. These convex-like keys 44 correspond to the switches 43, respectively. A plurality of keypad openings 45 are formed on the front casing 36. These keypad openings 45 correspond to the convex-like keys 44, respectively.

Also, a convex portion 46 is formed extending to the perimeter on the back surface of the waterproof type keypad sheet material 35 and has a radial thickness. The convex portion 46 is inserted in the slot 40 of the back casing 31 and the housing concave portion 38 is covered with the waterproof type keypad sheet material 35. In the state where the waterproof type keypad material 35 is inserted, the front casing 36 covers the front side of the back casing 31. A portion of the back casing 31 (edge of the housing concave portion 38) is fitted into the front casing 36. Furthermore, in the state where the back casing 31 has been fitted into the front casing 36, the convex-like keys 44 are inserted into the keypad openings 45 opposing the switches 43. The waterproof type keypad sheet material 35 (specifically, the edge section of the waterproof type keypad sheet material 35) is inserted between the back casing 31 and the front casing 36. The convex-like keys 44 and the convex portion 46 are waterproof type keypad sheet material 35 and formed as one piece. The convex-like keys 44, the convex portion 46 and the waterproof type keypad sheet material 35 are made of rubber.

A round-shaped mounting hole 47 penetrates through the waterproof type keypad sheet material 35 which opposes the microphone opening 8 and has a cylindrical circumference. The inner diameter of the mounting hole 47 is wider on the front face side and narrower on the back face side. The mounting hole 47 is a step-like shape. A microphone holder 48 is inserted into the mounting hole 47 from the front side. The microphone holder 48 contains a cylindrical portion 49 and a ring-shaped bottom plate portion 50 formed as one piece on one end of the front side of the cylindrical portion 49. A small opening 51 penetrates the center section of the bottom plate portion 50. The peripheral part of the bottom plate portion 50 projects more than the peripheral surface of the cylindrical portion 49 and is a flange-like shape. In the state where the microphone holder 48 has been inserted into the mounting hole 47, the cylindrical portion 49 of the microphone holder 48 is fitted in the portion where the diameter of the mounting hole 47 is narrower. The flange part of the bottom plate portion 50 is suspended on the step of the mounting hole 47. Furthermore, in a natural state where the microphone holder 48 has not been inserted into the mounting hole 47, the portion where the diameter of the mounting hole 47 narrows is slightly narrower than the diameter of the cylindrical portion 49. Subsequently, when the microphone holder 48 is inserted, the portion where the diameter of the mounting hole 47 narrow expands by elastic deformation. Thus, the cylindrical portion 49 of the microphone holder 48 will be fitted in the portion where the mounting hole 47 narrows so as to not have any clearance gap.

The microphone 60 is mounted within the cylindrical portion 49 of the microphone holder 48. The vibrating membrane of the microphone 60 faces toward the small opening 51 of the bottom plate portion 50. On the front face of the bottom plate portion 50 for the microphone holder 48, a waterproof membrane 52 is affixed with ring-shaped double-sided adhesive tape 53 having water resistance. The small opening 51 is blocked (shielded) by the waterproof membrane 52. On the surface of the opposite side of the waterproof membrane 52, cushioning material 54 is affixed with ring-shaped double-sided adhesive tape 55. By inserting the cushioning material 54 between the microphone holder 48 and the front casing 36, this prevents the inconvenience of sound leakage and diminished acoustic features between the microphone holder 48 and the front casing 36. Also, any impact shock occurring to the front casing 36 is absorbed by the cushioning material 54 and does not spread to the microphone holder 48 and the microphone 60.

In the portion the keypad FPC 34 which opposes the mounting hole 47, a circular notch 56 is formed. Also, in the portion of the intermediate plate 33 which opposes the mounting hole 47, a circular notch 57 is formed. The inside of the notch 57 accommodates the cylindrical portion of the mounting hole 47 circumference formed in the waterproof type keypad sheet material. Specifically, the microphone 60 mounted in the cylindrical portion 49 of the microphone holder 48 is placed in the notch 57. Although a method can be applied in which the electrical connections between the microphone 60 and the circuit substrate 32 are attached with lead wires to the microphone 60 and the connector joints of the circuit substrate 32, in the case of this embodiment when the casing is assembled, a method in which both electrode terminals contact (pressure welding) and electrically connect is desirable. Namely, the electrode terminals have a springy characteristic on either the microphone 60 lower surface or the upper surface of the circuit substrate 32 and fixed electrode terminals are provided on the other surface, respectively.

In assembling the lower housing 3, the circuit substrate 32 is housed in the housing concave portion 38 of the back casing 31. The circuit substrate 32 is covered with the intermediate plate 33. The circuit substrate 32 and the intermediate plate 33 are fixed to the back casing 31 with screws. Then, after attaching the connector joints of the keypad FPC 34 to the circuit substrate 32, the keypad FPC is mounted to the intermediate plate 33. In addition, when construction of the connector joints of the keypad FPC 34 and the circuit substrate 32 cannot be finished after the circuit substrate 32 and the intermediate plate 33 has been fixed to the back casing 31 with screws, the connector joints of the keypad FPC 34 to the circuit substrate 32 can be accomplished beforehand.

On the other hand, the microphone 60 is mounted in the cylindrical portion 49 of the microphone holder 48. By affixing the waterproof membrane 52 on which the cushioning material 54 is affixed to the bottom plate portion 50 of the microphone holder 48 with double-sided adhesive tape 53, the small opening 51 is blocked by the waterproof membrane 52. When the microphone holder 48 is inserted in the mounting hole 47 from the front side of the waterproof type keypad sheet material 35, the mounting hole 47 is blocked by the microphone holder 48 and the waterproof membrane 52.

With the microphone holder 48 and the microphone 60 mounted, the keypad FPC 34 is covered by the waterproof type keypad sheet material 35. The edge section for the convex portion 46 of the waterproof type keypad sheet material 35 is inserted in the slot 40 of the back casing 31. Also, the waterproof type keypad sheet material 35 is covered with the front casing 36 so that the convex-like keys 44 of the waterproof keypad sheet material 35 may be inserted into the keypad openings 45 of the front casing 36. The front casing 36 is made to fit into the back casing 31 and the waterproof type keypad sheet material 35 is inserted between the back casing 31 and the front casing 36. Finally, screws are inserted in the screw holes 37 from the outside of the back casing 31 and screwed into the front casing 36.

Additionally, the sequence of attachments is not particularly limited to the order mentioned above.

As described above, according to this first embodiment, the edge section for the convex portion 46 of the waterproof type keypad sheet material 35 is inserted in slot 40 of the back casing 31. Since the waterproof type keypad sheet material 35 (especially the edge section of the waterproof type keypad sheet material 35) is inserted between the back casing 31 and front casing 36, the circuit substrate 32, the intermediate plate 33 and the keypad FPC 34 are waterproofed.

Moreover, since the microphone holder 48 is inserted in the mounting hole 47 from the front side of the waterproof type keypad sheet material 35 and the small opening 51 of the microphone holder 48 is blocked by the waterproof membrane 52, water cannot seep into the housing concave portion 38 through the mounting hole 47 and the microphone 60 can be waterproofed. In particular, because the edge section of the bottom plate portion 50 of the microphone holder 48 constitutes a flange shape and the cylindrical portion 49 of the microphone holder 48 is rigidly constricted by the elastic force of the waterproof type keypad sheet material 35, this type of structure dramatically excels in ensuring complete waterproofness.

Also, since the microphone holder 48 affixed with the waterproof membrane 52 is inserted in the mounting hole 47 of the waterproof type keypad sheet material 35 and the microphone 60 is mounted in the microphone holder 48, structurally flexible waterproof type keypad sheet material 35 can be installed with the microphone 60.

Further, since the waterproof membrane 52 is affixed on the surface of the opposite side relative to the bottom instead the bottom of the cylindrical portion 49, the waterproof membrane can be easily affixed.

Besides, since the microphone holder 48 and the microphone 60 are inserted in the mounting hole 47 of the waterproof type keypad sheet material 35, a conventional cylindrical projection which protrudes from the inner surface of the front casing 36 is no longer necessary. Therefore, construction of the front casing 36 can be simplified.

Also, assuming that the waterproof membrane 52 is affixed on the bottom of the cylindrical portion 49 and the waterproof membrane 52 touches the vibrating membrane of the microphone 60, there is a possibility of having an adverse influence on the acoustic features of the microphone 60. However, in this first embodiment, since the waterproof membrane 52 is affixed on the surface of the opposite side relative to the bottom in the cylindrical portion 49, this structure does not have an adverse influence on the acoustic features of the microphone 60.

Lastly, by affixing the waterproof membrane 52 on the surface of the opposite side relative to the bottom in the cylindrical portion 49, the area (the inner diameter part of the double-sided adhesive tape 53) in which the waterproof membrane 52 vibrates can be enlarged and decline of the acoustic features can be prevented.

B. Second Embodiment

Figure 4:
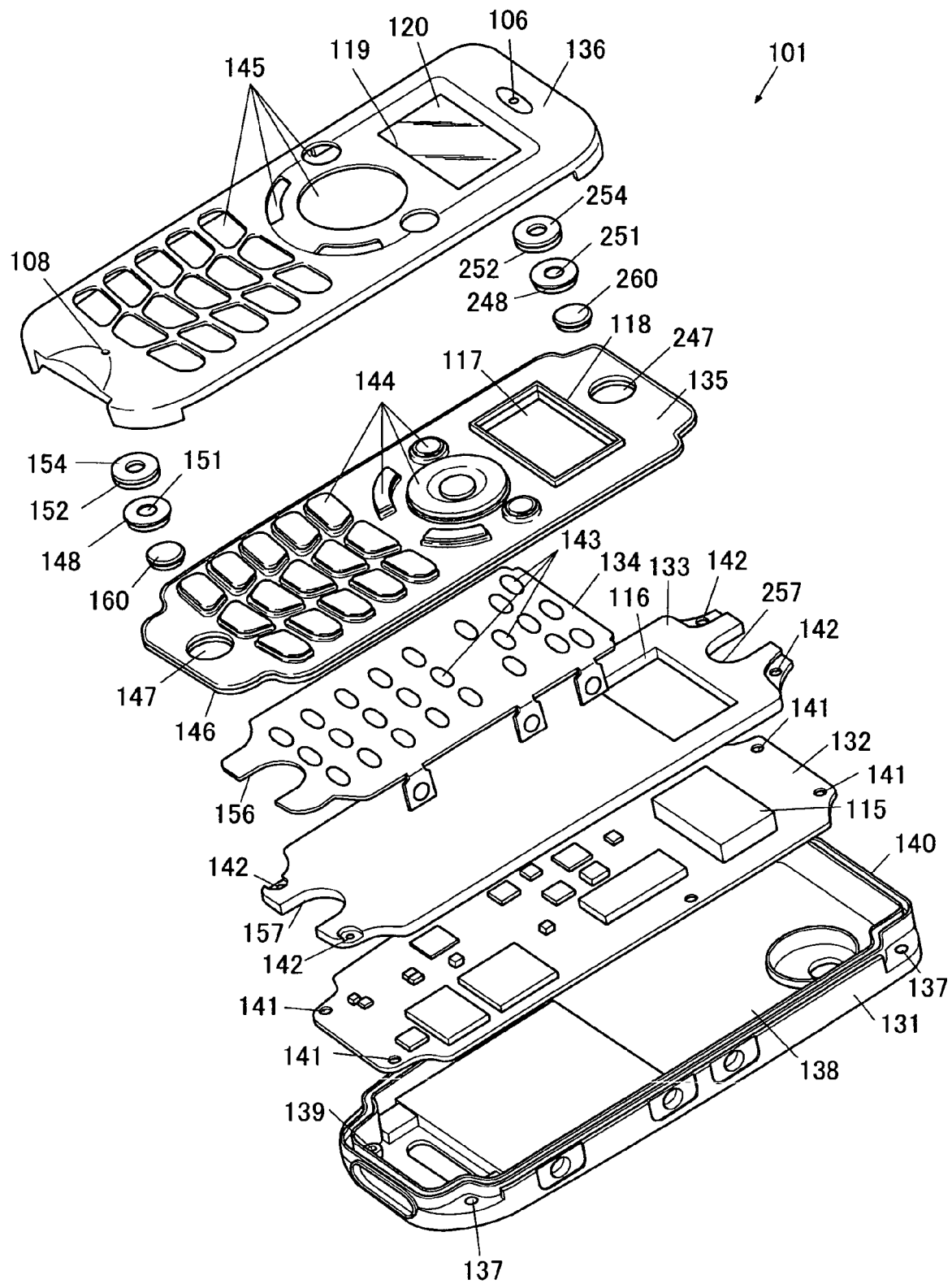
FIG. 4 shows an exploded perspective view of a portable telephone 101.

Next, the second embodiment will be explained with reference to FIG. 4.

In the first embodiment described above, the portable telephone 1 is a foldable type portable telephone. In this second embodiment, the portable telephone 101 is a straight type portable telephone. In short, the portable telephone 101 is not divided into an upper housing and a lower housing, thus having one housing. In the following explanation about the portable telephone 101, common last two-digit numbers which correspond to an element of the portable telephone 1 in the first embodiment are appended.

The housing of the portable telephone 101 corresponds substantially to the lower housing 3 in the first embodiment and comprises a cover front casing 136 for the front side of a back casing 131 and a back casing 131. The housing concave portion 138, the screw holes 139 and the slot 140 are formed in the back casing 131 like the back casing in the first embodiment.

A liquid crystal type or electroluminescence type display panel 115 is mounted in the circuit substrate 132 housed in the housing concave portion 138. A rectangle hole 116 penetrates the intermediate plate 133 which covers the circuit substrate 132 and the display panel 115 is inserted in the rectangle hole 116.

A rectangle hole 117 is formed in the portion which opposes the rectangle hole 116 of the waterproof type keypad sheet material 135 and the display panel 115 faces the rectangle hole 117. A rectangular frame-shaped rib 118 is formed in the front of the waterproof type keypad sheet material 135 as one piece and protrudes so that the rib 118 encloses the rectangle hole 117. The rib 118 contacts with the inside of the front casing 136 and the display panel 115 is waterproofed by the rib 118 being inserted between the intermediate plate 133 and the front casing 136.

A display window 119 is formed in the portion which opposes the rectangle hole 117 of the front casing 136. A transparent plate 130 is affixed on the inside of the front casing 136 with double-sided adhesive tape and the display window 119 is blocked by the transparent plate 120.

A speaker opening 106 is formed on the upper side of the display window 119. A round-shaped mounting hole 247 opposes the speaker opening 106 which penetrates the respective portion the waterproof keypad sheet material 135. The mounting hole 247 and the shape of this peripheral part are identical to the case of the mounting hole 47 in the first embodiment. Furthermore, a speaker holder 248 is inserted from the front side, a speaker 260 is mounted on the speaker holder 248, and a small opening 251 of the speaker holder 248 is blocked by the waterproof membrane 252 in the mounting hole 247. The ring-shaped cushioning material 254 is affixed on the waterproof membrane 252. Specifically, the mounting hole 247, the speaker holder 248, the speaker 260, the waterproof membrane 252 and the cushioning material 254 are attached like the case of the mounting hole 47, the microphone holder 48, the microphone 60, the waterproof membrane 52 and the cushioning material 54 in the first embodiment, respectively. This housing arrangement is inserted in the notch 257 formed in the intermediate plate 133. Also, the electrical connections between the speaker 260 and the circuit substrate 132 are the same as the connections of the microphone 60 and the circuit substrate 32 in the first embodiment.

The microphone holder 148 is inserted in the mounting hole 147 of the waterproof type keypad sheet material 135 from the front side and the microphone 160 is mounted on the microphone holder 148. The mounting hole 147, the microphone holder 148, the microphone 160, the waterproof membrane 152 and the cushioning material 154 are attached like the case of the mounting hole 47, the microphone holder 48, the microphone 60, the waterproof membrane 52 and the cushioning material 54, respectively. Also, the microphone 160 faces the microphone opening 108.

Except for the explanation above, the portions which respectively correspond between the portable telephone 101 and the portable telephone 1 are constituted in a similar manner.

As mentioned above, also in this second embodiment, the circuit substrate 132, the intermediate plate 133 and the keypad FPC 134 are waterproofed by the waterproof type keypad sheet material 135. The microphone 160 is waterproofed by the microphone holder 148 and the waterproof membrane 152. The speaker 260 is waterproofed by the speaker holder 248 and the waterproof membrane 252. Also in the case of assembly, the waterproof membrane 152, 252 can be easily affixed and a structurally flexible waterproof type keypad sheet material 135 can be installed with the microphone 160 and the speaker 260.

Furthermore, the present invention is not limited to each of the above-mentioned embodiments. It is intended that various improvements and design changes can be effected within the scope which does not deviate from the object of the present invention.

For example, although each of the above-mentioned embodiments has been explained by stating examples of the portable telephone 1, 101 as the electronic equipment, the present invention may be also be applied when mounting an electroacoustic transducer on the electronic equipment, such as a notebook type personal computer, a digital camera, a wrist watch, a PDA (Personal Digital Assistant), an electronic notebook, a portable walkie-talkie, etc.

While the present invention has been described with reference to the preferred embodiments, it is intended that the invention be not limited by any of the details of the description therein but includes all the embodiments which fall within the scope of the appended claims.

What is claimed is:

1. A mounting structure for an electroacoustic transducer relating to a portable communication apparatus having a plurality of casings, the mounting structure comprising:
    an elastic sheet material covering a housing concave portion between a first casing having the housing concave portion formed therein and a second casing covering the housing concave portion in the first casing, an outer edge section of the elastic sheet material being fastened between an edge of the housing concave portion and the second casing;
    a cylindrical holder fitted in a mounting hole in the elastic sheet material;
    a waterproof membrane affixed to one end face of the cylindrical holder on a side of the second casing such that one opening of the cylindrical holder is blocked by the waterproof membrane; wherein the mounting hole is blocked by the cylindrical holder and the waterproof membrane; and
    an electroacoustic transducer mounted within the cylindrical holder.

2. The mounting structure for an electroacoustic transducer according to claim 1,
    wherein the elastic sheet material is formed as one piece containing a convex portion, which extends to a perimeter of the outer edge section of the elastic sheet material and has a radial thickness; and
    wherein the convex portion is fastened between the edge of the housing concave portion and the second casing.

3. The mounting structure for an electroacoustic transducer according to claim 2, wherein a slot formed along the edge of the housing concave portion and the convex portion is inserted in the slot.

4. The mounting structure for an electroacoustic transducer according to claim 3,
    wherein the elastic sheet material is formed as one piece containing a convex portion, which extends to a perimeter of the outer edge section of the elastic sheet material and has a radial thickness; and
    wherein the convex portion is fastened between the edge of the housing concave portion and the second casing.

5. The mounting structure for an electroacoustic transducer according to claim 3, wherein convex keys are formed in the elastic sheet material as one piece and the convex keys are inserted into keypad openings which penetrate the second casing.

6. The mounting structure for an electroacoustic transducer according to claim 3, wherein a peripheral part of one end face side of the cylindrical holder projects in a flange shape and the peripheral part of the flange shape serves as a fastening mechanism for retaining the elastic sheet material.

7. The mounting structure for an electroacoustic transducer according to claim 2, wherein convex keys are formed in the elastic sheet material as one piece and the convex-like keys are inserted into keypad openings which penetrate the second casing.

8. The mounting structure for an electroacoustic transducer according to claim 7, wherein a slot formed along the edge of the housing concave portion and the convex portion is inserted in the slot.

9. The mounting structure for an electroacoustic transducer according to claim 2, wherein a peripheral part of one end face side of the cylindrical holder projects in a flange shape and the peripheral part of the flange shape serves as a fastening mechanism for retaining the elastic sheet material.

10. The mounting structure for an electroacoustic transducer according to claim 9, wherein a slot formed along the edge of the housing concave portion and the convex portion is inserted in the slot.

11. The mounting structure for an electroacoustic transducer according to claim 1, wherein convex keys are formed in the elastic sheet material as one piece and the convex keys are inserted into keypad openings which penetrate the second casing.

12. The mounting structure for an electroacoustic transducer according to claim 11,
    wherein the elastic sheet material is formed as one piece containing a convex portion, which extends to a perimeter of the outer edge section of the elastic sheet material and has a radial thickness; and wherein the convex portion is fastened between the edge of the housing concave portion and the second casing.

13. The mounting structure for an electroacoustic transducer according to 11, wherein a peripheral part of one end face side of the cylindrical holder projects in a flange shape and the peripheral part of the flange shape serves as a fastening mechanism for retaining the elastic sheet material.

14. The mounting structure for an electroacoustic transducer according to claim 1, wherein a peripheral part of one end face side of the cylindrical holder projects in a flange shape and the peripheral part of the flange shape serves as a fastening mechanism for retaining the elastic sheet material.

15. The mounting structure for an electroacoustic transducer according to claim 14,
wherein the elastic sheet material is formed as one piece containing a convex portion, which extends to a perimeter of the outer edge section of the elastic sheet material and has a radial thickness; and wherein the convex portion is fastened between the edge of the housing concave portion and the second casing.

16. The mounting structure for an electroacoustic transducer according to claim 14, wherein convex keys are formed in the elastic sheet material as one piece and the convex-like keys are inserted into keypad openings which penetrate the second casing.

17. The mounting structure for an electroacoustic transducer according to 14, wherein a peripheral part of one end face side of the cylindrical holder projects in a flange shape and the peripheral part of the flange shape serves as a fastening mechanism for retaining the elastic sheet material.

* * * * *